Patented May 6, 1941

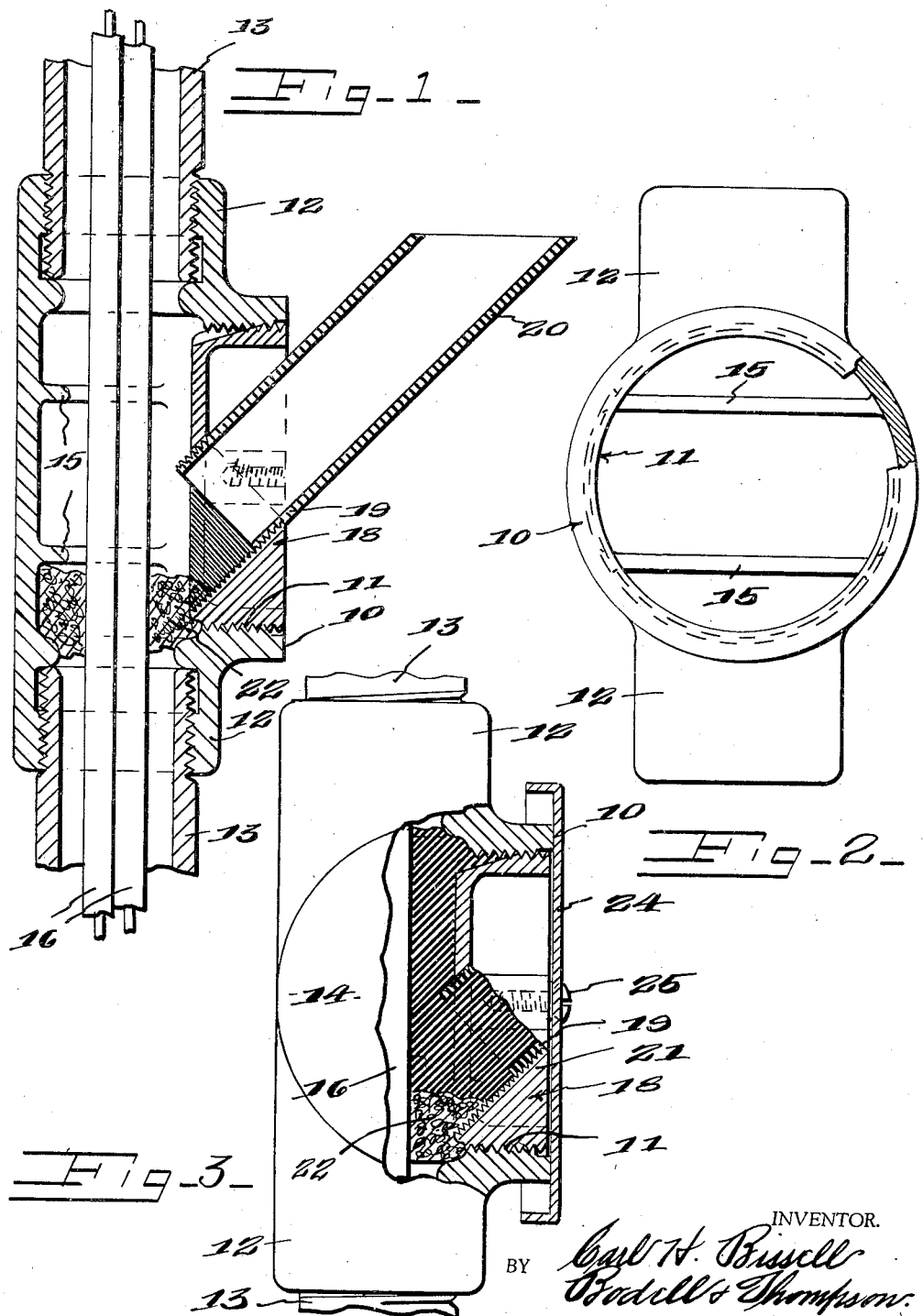

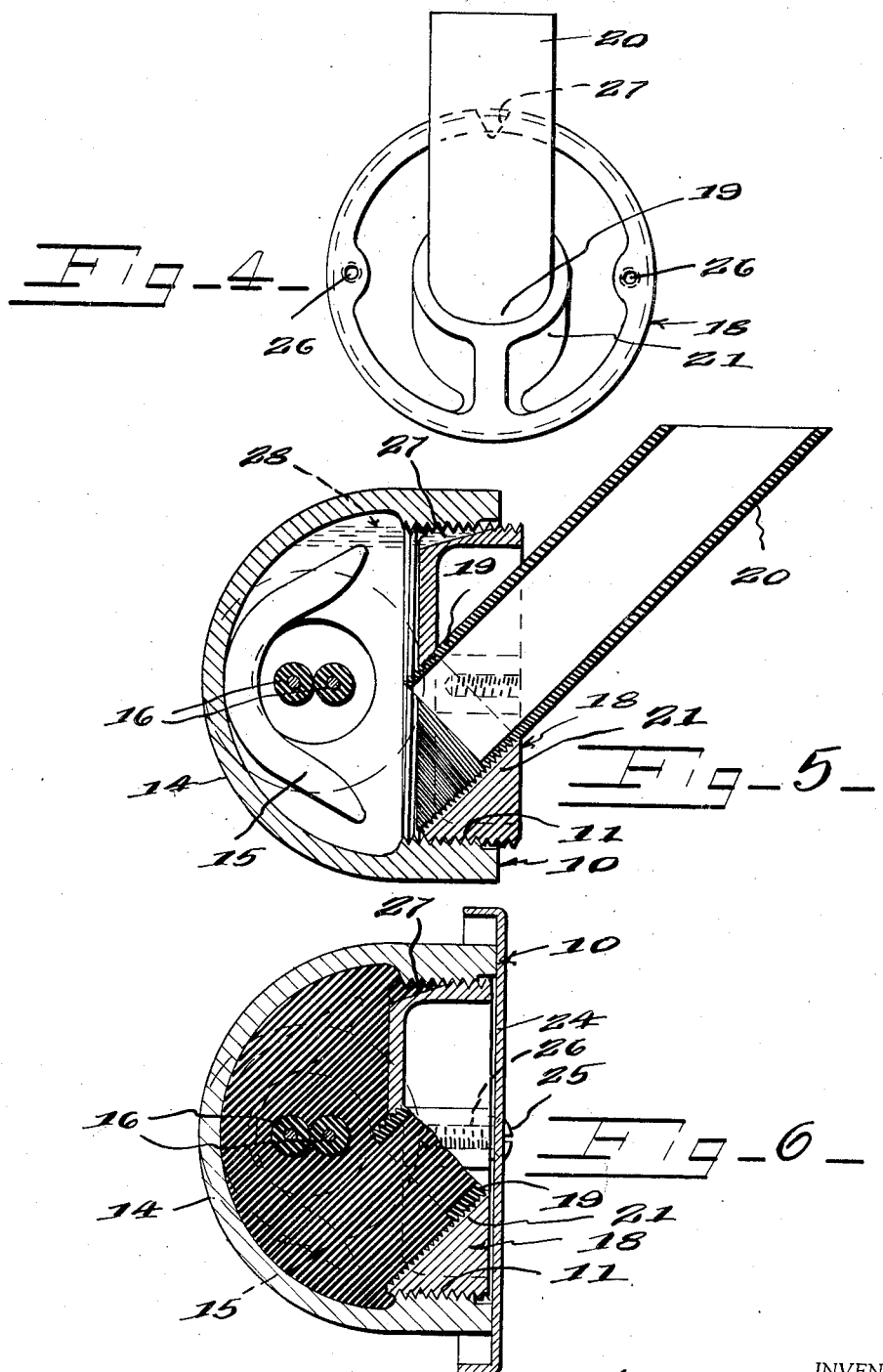

2,240,831

UNITED STATES PATENT OFFICE 2,240,831

SEALING FITTING FOR CONDUIT LINES

Carl H. Bissell, Syracuse, N. Y., assignor to Crouse Hinds Company, Syracuse, N. Y., a corporation of New York Application January 25, 1940, Serial No. 315,567

5 Claims. (Cl. 285—205)

This invention relates to sealing fittings employed to seal off one portion of an electrical conduit system from another portion thereof. The function of such fittings is to seal off the otherwise uninterrupted conduit passage so as to prevent moisture and vapors present in one portion of the conduit line from passing throughout the remainder of the conduit system. This sealing off is effected by the use of a suitable sealing compound which may be rendered molten or fluid by the application of heat, or may be a cement-like mixture such as litharge and glycerine. The compound is poured into the body of the fitting and upon solidifying becomes a hard, solid, mass effectively sealing the passage in the conduit system.

Fittings for this purpose have heretofore comprised a hollow body member connected into the conduit line and being formed with an aperture or a work opening through which the sealing compound is poured and subsequently, the opening is closed by screwing a plug therein or otherwise affixing a closure member to the body member.

Such fittings are suitable for use where the conduit is exposed as is the case in nearly all industrial applications. However, when the conduit system is concealed, as in the partition of a hospital operating room, such fittings are not suitable in that their covers with pouring openings protrude objectionably beyond the finished wall surface. It is understood that the rules of the National Electrical Code, and the rules of many states and municipalities, require that all boxes of this type be accessible without disturbance of any part of the building.

From the above it will be seen that the problem is to provide a work opening for making the necessary dams to confine the compound to the box enclosure, and a pouring opening for the compound which will not protrude beyond the finished wall surface. Also, that the box opening be accessible at all times.

This invention has as an object a sealing fitting which may be installed in a vertical conduit run, or in a horizontal conduit run with the opening of the fitting facing laterally instead of upwardly, and the sealing compound can be quickly and conveniently run into the interior of the body member until the same is completely filled.

The invention has as a further object a fitting of the type referred to embodying a tubular inlet or filling member extending outwardly and upwardly and serving as a convenient means to receive the compound and direct it into the interior of the fitting, and which tubular member may be quickly and conveniently severed from the fitting after the compound has solidified without leaving any projection extending beyond the face or side of the fitting.

The invention further includes a cover member detachably secured to the fitting after the compound has solidified and which provides a neat, attractive and uniform appearance to all of the fittings in the installation.

The invention consists in the novel features and in the combinations and constructions hereinafter set forth and claimed.

In describing this invention, reference is made to the accompanying drawings in which like characters designate corresponding parts in all the views.

Figure 1 is a lengthwise sectional view of a fitting embodying my invention, the fitting being illustrated in a vertical conduit run.

Figure 2 is a top plan view of the body member of the fitting with a portion broken away.

Figure 3 is a side elevational view of the fitting shown in Figure 1 with parts broken away and parts in section illustrating the completed fitting after the compound has solidified.

Figure 4 is a front elevational view of the closure member of the fitting.

Figure 5 is a transverse sectional view, similar to Figure 1, but illustrating the fitting arranged in a horizontal conduit run.

Figure 6 is a view, similar to Figure 5, illustrating the completed fitting after the compound has solidified.

The fitting comprises a body member having a substantially circular face side 10 formed with an internally threaded opening 11. The body is formed with radially extending hub portions 12 provided with apertures to receive the conduits 13. The intermediate portion of the body, contiguous to the circular face 10, is bowl-shaped or semi-circular in cross section, as indicated at 14, Figures 5 and 6, and forms a sealing chamber intermediate the hubs 12. The interior of the bowl-shaped sealing chamber 14 is formed with a pair of transversely extending ribs 15 arranged adjacent the hubs 12.

The body is connected in the conduit run. As here shown, the ends of the conduits 13 are threaded into the apertures formed in the hubs 12, and the conductors 16 are thereafter pulled through the conduit system.

The opening 11 is closed by a plug or closure member 18. Preferably, the closure member 18 is threaded externally so that the same may be screwed into the opening 11, although the closure may be otherwise secured in the body of the fitting. The closure member 18 is formed with an aperture extending therethrough and into which a tubular inlet or filling member 19 is inserted and which has an outer portion 20 extending outwardly and in angular relationship to the axis of the plug 18.

In the embodiment here shown, the plug is formed with a boss 21 extending at an angle of substantially 45° to the axis of the plug, and the boss is formed with a threaded aperture. The inlet or filling member 20 is in the nature of a short tube formed of easily fracturable or breakable material, such as porcelain or fiber. One end of the tubular member 20 is inserted or threaded into the aperture of the boss 21, and the outer end is cut at an angle to the axis of the tube to conveniently receive the fluid compound and conduct the same through the aperture of the plug member into the interior of the body.

When the fitting is installed in a vertical conduit run, as shown in Figures 1 and 2, the plug 18 is screwed into the opening 11 until it is flush with the margin about the opening or slightly inside of the margin with the tubular member extending outwardly and upwardly. Previous to the insertion of the plug 18, a dam 22 of fibrous material, such as asbestos, is formed in the lower end of the fitting and packed tightly about the conductors 16. The ribs 15 serve to anchor the compound in position when the chamber is not entirely filled with compound as may be the case in vertical seals. After the dam 22 has been installed, and the plug or closure member 18 applied to the body of the fitting, the compound is poured through the tube 20, as indicated in Figure 3. After the compound has solidified, the tube 20 may be removed by breaking the same adjacent the point where it enters the aperture in the boss 21. If desired, a cover member 24 may be subsequently applied to the face of the fitting as by screws 25 extending through the cover 24 and threading into apertures 26 formed in the peripheral margin of the plug 18.

This fitting is equally as convenient for use in a horizontal run of conduit. In such an installation, a dam 22 is formed in each end of the body. The plug 18 is then threaded into the opening 11. However, the plug 18 is not threaded in the full depth, but only a portion thereof, as indicated in Figure 5.

A groove 27 is formed in the periphery of the plug and extends outwardly and upwardly terminating one or two threads from the outer face of the plug. Accordingly, when the plug is not threaded completely in the body of the fitting, as shown in Figure 5, a portion of the groove 27 extends outwardly beyond the threaded aperture 11 and thus forms a vent to permit the ready escape of air from within the fitting while the sealing compound is being poured in through the tubular member 20. This permits the body of the fitting to be filled well above the upper side of the conduits, as indicated at 28, Figure 5. While the compound is still in plastic condition, the workman applies a temporary closure to the outer end of the tube 20 and rotates the plug 18 one or two turns until the outer edge thereof is flush with the margin about the opening 11. During this operation, the space within the interior of the fitting is slightly reduced causing the compound to completely fill the fitting, as indicated in Figure 6.

The inlet or filling tubes 20 may be formed of metal, or other durable material, and may be removed from the closure member after the compound has sufficiently solidified. However, I find this to be a rather tedious task and the compound has to be subsequently removed from the tubes in order to permit their use again. Accordingly, I prefer to form the filling members of readily fracturable material, for example Bakelite or porcelain, which is not expensive in cost and which may be quickly severed from the closure member by a hammer blow leaving the inner end portion of the tube in the aperture in the plug, as shown in Figures 2 and 6.

Sealing fittings made in accordance with my invention provide a complete and adequate seal and are particularly advantageous in that the sealing compound can be conveniently poured into the fitting regardless of whether it is connected in a vertical or horizontal run of conduit, and after the sealing operation there is no unsightly projection to detract from the finished appearance of the installation.

What I claim is:

1. A sealing fitting for a conduit line comprising a body formed with an opening in one side thereof and being provided with conduit receiving apertures, a plug arranged in said opening and acting as a closure therefor and being provided with an aperture extending therethrough, a tubular member of readily fracturable material inserted in the aperture of said closure member and extending outwardly at an angle to the axis thereto, said member acting to direct fluid sealing compound through the aperture of the closure member into the body.

2. A sealing fitting for an electrical conduit line comprising a body formed with an internally threaded opening in one side thereof and being provided with conduit receiving apertures, a plug threaded into said opening and being formed with an aperture extending through the plug, a tubular filling member of readily breakable material inserted in said aperture and extending outwardly from said plug in angular relation to the axis thereof, said tubular member acting to direct sealing compound through the plug into the body.

3. A sealing fitting for electrical conduit lines comprising a body provided with conduit receiving apertures and having an opening in one side thereof, a closure member arranged in said opening, one of said members being provided with a vent passage and said closure member being movable relative to the body member to close said vent passage, said closure member being formed with an aperture extending therethrough and a tubular filling member of breakable material inserted in said aperture and extending outwardly from said plug member in angular relationship to the axis thereof.

4. A sealing fitting for electrical conduit lines comprising a body formed with a sealing chamber having an opening in one side thereof and being provided with conduit receiving passages communicating with said chamber, a tubular filling member arranged in said opening and operable to direct fluid sealing compound through said opening into the sealing chamber, said tubular member being formed of readily fracturable material.

5. A sealing fitting for electrical conduit lines comprising a body formed with a sealing chamber and having an opening in one side thereof and being provided with conduit receiving passages communicating with said chamber, the interior of said chamber being provided with a transversely extending sealing dam retaining rib arranged in proximity to each of said conduit receiving passages, a tubular filling member arranged in said opening and operable to direct fluid sealing compound through said opening into said sealing chamber, said tubular member being formed of readily breakable material.

CARL H. BISSELL.